(12) United States Patent
Wu et al.

(10) Patent No.: US 7,324,183 B2
(45) Date of Patent: Jan. 29, 2008

(54) THIN FILM TRANSISTOR ARRAY SUBSTRATE AND REPAIRING METHOD THEREOF

(75) Inventors: Chun-Lin Wu, Taichung County (TW); Kai-Yuan Ho, Taichung County (TW); Chau-Chi Shen, Hsinchu County (TW); Ren-Jie Chen, Yilan County (TW)

(73) Assignee: Au Optronics Corporation, Hsinchu (TW)

( * ) Notice: Subject to any disclaimer, the term of this patent is extended or adjusted under 35 U.S.C. 154(b) by 519 days.

(21) Appl. No.: 10/906,891

(22) Filed: Mar. 11, 2005

(65) Prior Publication Data
US 2006/0012726 A1    Jan. 19, 2006

(30) Foreign Application Priority Data
Jul. 15, 2004    (TW) ............................. 93121093 A

(51) Int. Cl.
G02F 1/1343    (2006.01)
G02F 1/1333    (2006.01)
G02F 1/136    (2006.01)

(52) U.S. Cl. ...................... 349/143; 349/54; 349/43; 349/144

(58) Field of Classification Search ............... 349/143, 349/114, 54, 43
See application file for complete search history.

(56) References Cited

U.S. PATENT DOCUMENTS

| 6,300,996 | B1* | 10/2001 | Matsuyama et al. | 349/144 |
| 7,015,548 | B2* | 3/2006 | Song et al. | 257/347 |
| 7,110,056 | B2* | 9/2006 | Matsui et al. | 349/38 |
| 7,139,043 | B2* | 11/2006 | Kwon et al. | 349/39 |
| 2007/0159571 | A1* | 7/2007 | Yang | 349/54 |

* cited by examiner

*Primary Examiner*—Mike Qi
(74) *Attorney, Agent, or Firm*—Jiang Chyun IP Office

(57) ABSTRACT

A thin film transistor array substrate and repairing methods thereof are disclosed. The thin film transistor array substrate comprises openings in each pixel electrode, each capacitor electrode and each common line. The openings of the capacitor electrode and the common line are located in the opening of the pixel electrode. The opening of the capacitor electrode exposes a portion area of the capacitor electrode and the common line. The pixel electrode is coupled to the common line through a connecting conductive layer. The MII storage capacitor Cst is formed by the pixel electrode and the capacitor electrode. When the MII storage capacitor Cst fails, the MII storage capacitor Cst can be switched to the MIM storage capacitor Cst by laser repairing.

27 Claims, 9 Drawing Sheets

THIN FILM TRANSISTOR ARRAY SUBSTRATE AND REPAIRING METHOD THEREOF

CROSS-REFERENCE TO RELATED APPLICATION

This application claims the priority benefit of Taiwan application Ser. No. 93121093, filed on Jul. 15, 2004.

BACKGROUND OF THE INVENTION

1. Field of the Invention

The present invention relates to a thin film transistor (TFT) array substrate, and more particularly to a TFT array substrate and repairing methods thereof.

2. Description of the Related Art

With the advance of semiconductor and display technology, Cathode Ray Tube (CRT) had been dominating the market for a long time due to its good display quality and low costs. Due to the change of users' behavior with respect to the multi-terminals or multi-displays and the concern of power consumption, CRT may not provide desired demands. Accordingly, Thin Film Transistor Liquid Crystal Display (TFT-LCD) with high display quality, space-efficiency, low power consumption and non-radiation has been gradually replacing CRT in the market.

TFT-LCD usually comprises a thin film transistor array substrate, a color filter array substrate and a liquid crystal layer. The thin film transistor array substrate comprises a plurality of thin film transistors arranged in an array, and pixel electrodes corresponding thereto. The thin film transistors serve as switches of pixel units. In order to control the pixel units individually, scan lines and data lines are used to select a specified pixel so as to provide the operating voltages to the pixel and display the data corresponding to the pixel. A portion area of the pixel electrode covers the scan line or the common line so as to form a storage capacitor. The storage capacitor includes, for example, a first-metal/insulator/second-metal (MIM) storage capacitor and a first-metal/insulator/indium-tin-oxide (MII) storage capacitor. Following are the detailed descriptions of these storage capacitors.

FIG. 1 is a schematic cross sectional view showing a prior art MIM storage capacitor. Referring to FIG. 1, the MIM storage capacitor Cst is formed by the scan line or the data line 100 and the capacitor electrode 120. In the MIM capacitor, the scan line or the data line 100 is isolated from the capacitor electrode 120 by the gate insulator 110. The capacitance of the storage capacitor Cst relates to the thickness of the gate insulator 110. The pixel electrode 140 is coupled to the capacitor electrode 120 through the contact 132 in the passivation layer 130.

FIG. 2 is a schematic cross sectional view showing a prior art MII storage capacitor. Referring to FIG. 2, the MII storage capacitor is formed by the scan line or the data line 200 and the pixel electrode 230. Compared with the MIM storage capacitor, the scan line or the data line 200 of the MII storage capacitor is isolated from the pixel electrode 230 by the gate insulator 210 and the passivation layer 220. The capacitance of the storage capacitor Cst relates to the thickness of the gate insulator 210 and the passivation layer 220.

Either the MIM storage capacitor or the MII storage capacitor is used in the pixels of TFT-LCD so as to store charges. However, defects or particles resulting from processes may exist in the dielectric layer, i.e. the gate insulator or the passivation layer, so as to cause the leakage issue of the storage capacitor. Moreover, un-opened contact holes or pixel electrode residues may fail the storage capacitor. This makes abnormal operation of the pixel and decreases the display quality.

SUMMARY OF THE INVENTION

Accordingly, the present invention is directed to a thin film transistor array substrate and a repairing method thereof for repairing defective storage capacitors so as to improve yield.

According to an embodiment of the present invention, a thin film transistor array substrate is provided. The thin film transistor array substrate comprises a substrate, a plurality of scan lines, a plurality of data lines, a plurality of thin film transistors, a plurality of pixel electrodes, a plurality of common lines, a plurality of capacitor electrodes and a plurality of connecting conductive layers. The scan lines are disposed on the substrate. The data lines are disposed on the substrate, wherein the scan lines and the data lines define a plurality of pixel areas on the substrate. Each of the thin film transistors is disposed in one of the pixel areas. Each of the pixel electrodes is disposed in one of the pixel areas and coupled to one of the thin film transistor corresponding thereto. Each of the pixel electrodes has a first opening. The common lines are disposed on the substrate. A portion area of each of the pixel electrodes is located over one of the common lines. Each of the common lines has a second opening, which is located in the first opening. Each of the capacitor electrodes having a third opening located in the first opening is disposed between one of the pixel electrodes and one of the common lines. The third opening and the second opening are partially overlapped. A portion area of one of the common lines is exposed by the third opening. Each of the connecting conductive layers is disposed in the first opening. Each of the connecting conductive layers is coupled to one of the capacitor electrodes and one of the common lines 4.

Each of the common lines comprises a fourth opening and a fifth opening. The second opening is formed between the fourth and the fifth openings. A passivation layer is disposed between the pixel electrodes and the capacitor electrodes. The passivation layer comprises a plurality of first contact holes and a plurality of second contact holes. Each of the connecting conductive layers is coupled to one of the common lines through one of the first contact holes and one of the capacitor electrodes through one of the second contact holes. Each of the pixel electrodes comprises at least a first slit and a second slit. An extension direction of the first slit is substantially different from that of the second slit, and the first slit and the second slit connect with the first opening.

According to an embodiment of the present invention, the repairing method is provided. When a particle or a defect exists between one of the pixel electrodes and one of the common lines, a storage capacitor formed by one of the pixel electrodes and one of the capacitor electrodes corresponding thereto becomes defective. This defect can be repaired by removing a portion area of the connecting conductive layer of the defective storage capacitor so as to isolate the capacitor electrode of the defective storage capacitor from the common line corresponding thereto. Then, a portion area of the pixel electrode of the defective storage capacitor is removed so as to isolate the pixel electrode from the common line of the defective storage capacitor. Finally, the pixel electrode corresponding to the fourth and the fifth openings, and the capacitor electrode are welded.

According to another embodiment of the present invention, when a particle or a defect exists between one of the pixel electrodes and one of the common lines, a storage capacitor formed by one of the pixel electrodes and one of the capacitor electrodes corresponding thereto becomes defective. To repair this defect, a portion area of the connecting conductive layer of the defective storage capacitor is removed so as to isolate the capacitor electrode of the defective storage capacitor from the common line corresponding thereto. Then, the pixel electrode corresponding to the fourth and the fifth openings, and the capacitor electrode are welded.

According to yet another embodiment of the present invention, when a pixel electrode residue exists between two pixel electrodes, a storage capacitor formed by one of the pixel electrodes and one of the capacitor electrodes corresponding thereto becomes defective. To repair this defect, a portion area of the connecting conductive layer of the defective storage capacitor is removed so as to isolate the capacitor electrode of the defective storage capacitor from the common line corresponding thereto. Then, a portion area of the pixel electrode of the defective storage capacitor and a portion area of the pixel electrode residue are removed so as to isolate the two pixel electrodes from each other. Finally, the pixel electrode corresponding to the fourth and the fifth openings, and the capacitor electrode are welded.

According to yet another embodiment of the present invention, when a pixel electrode residue exists on one of the pixel electrodes and pixel electrode residue contacts a portion area of one of the connecting conductive layers, a storage capacitor formed by one of the pixel electrodes and one of the capacitor electrodes corresponding thereto becomes defective. To repair this defect, a portion area of the connecting conductive layer of the defective storage capacitor is removed so as to isolate the capacitor electrode of the defective storage capacitor from the common line corresponding thereto. Then, a portion area of the pixel electrode of the defective storage capacitor and a portion area of the pixel electrode residue are removed so as to isolate the pixel electrode from the connecting conductive layer. Finally, the pixel electrode corresponding to the fourth and the fifth openings, and the capacitor electrode are welded.

According to an embodiment of the present invention, when a first contact hole and/or a second contact hole within the passivation layer is not opened, a storage capacitor formed by one of the pixel electrodes and one of the capacitor electrodes corresponding thereto becomes defective. This defect can be repaired by welding the connecting conductive layer corresponding to the first contact hole and/or the second contact hole, and a portion area of the common line.

According to an embodiment of the present invention, openings are formed in each of the pixel electrode, the capacitor electrode and the common line. The openings formed in the capacitor electrode and the common line are located in the opening formed in the pixel electrode. The opening formed in the pixel electrode exposes a portion area of the common line and the connecting conductive layer. The capacitor electrode is coupled to the common line by forming the connecting conductive layer in the opening of the pixel electrode so as to form a metal/insulator/indium-tin-oxide (MII) storage capacitor, which is formed by the pixel electrode and the capacitor electrode. When the storage capacitors fail due to particles or pits, un-opened contact holes or pixel electrode residues, the (MII) storage capacitor can be switched to the first-metal/insulator/second-metal (MIM) storage capacitor by a laser cutting process. Accordingly, the repaired pixel functions normally and the yield is improved.

The above and other features of the present invention will be better understood from the following detailed description of the preferred embodiments of the invention that is provided in communication with the accompanying drawings.

DESCRIPTION OF EMBODIMENTS

Figure 1:
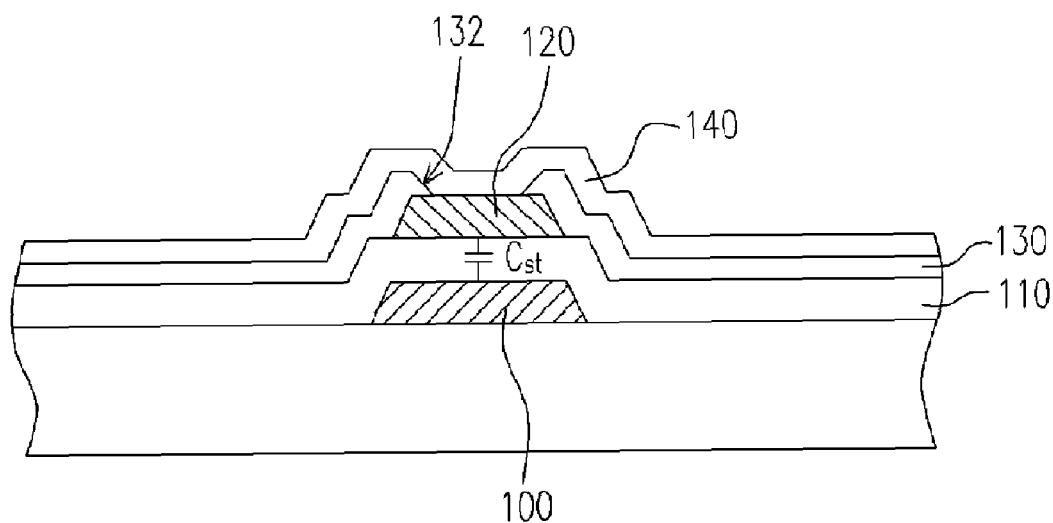
FIG. 1 is a schematic cross sectional view showing a prior art MIM storage capacitor.
Figure 2:
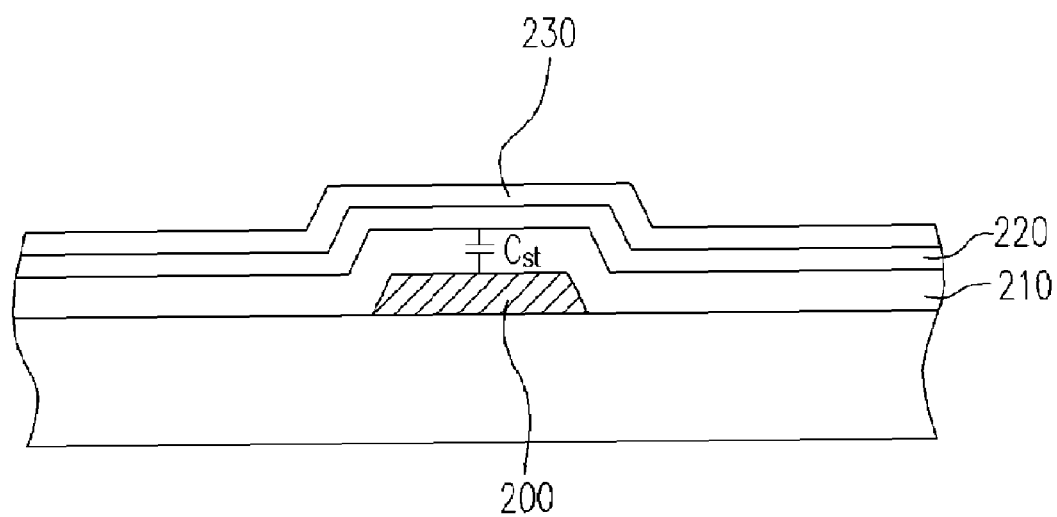
FIG. 2 is a schematic cross sectional view showing a prior art MII storage capacitor.
Figure 3:
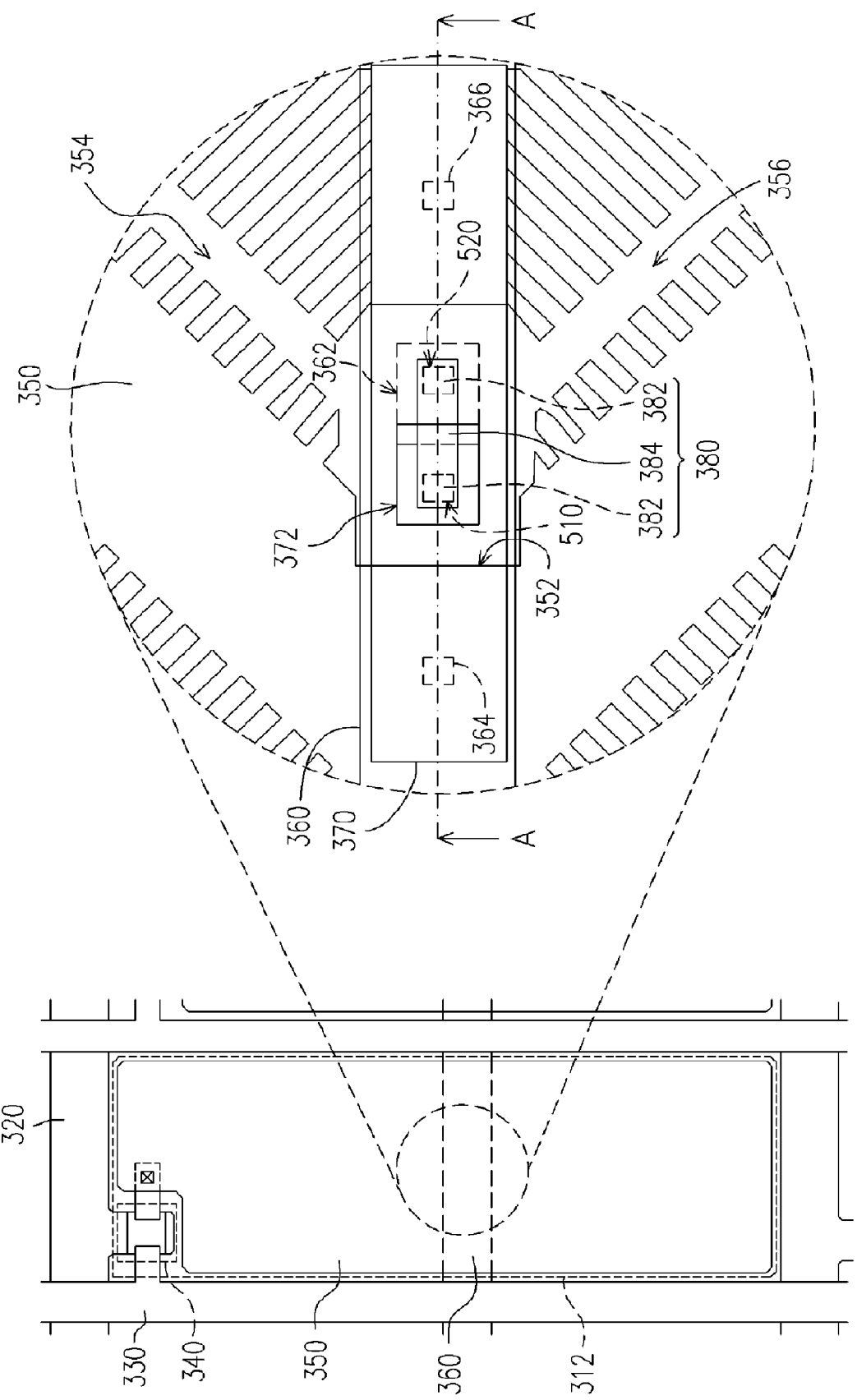
FIG. 3 is a schematic drawing showing a thin film transistor array substrate according to an embodiment of the preset invention.
Figure 4:
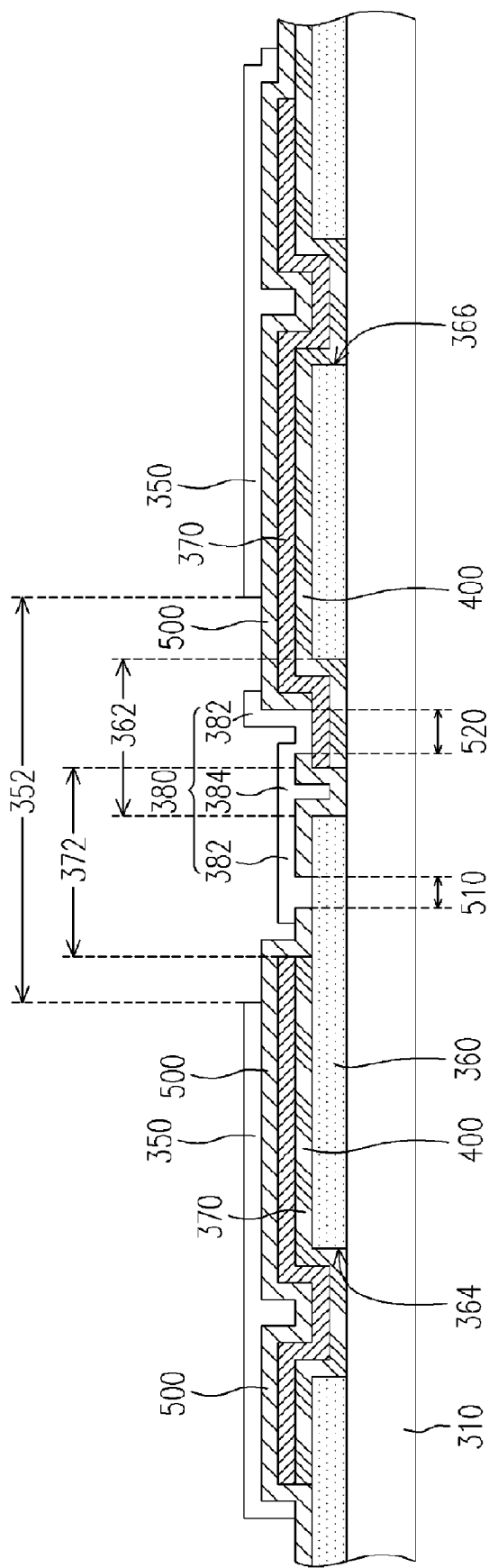
FIG. 4 is a cross sectional view of the thin film transistor array substrate along A-A in FIG. 3.

FIG. 3 is a schematic drawing showing a thin film transistor array substrate according to an embodiment of the preset invention. FIG. 4 is a cross sectional view of the thin film transistor array substrate along A-A in FIG. 3.

Referring to FIGS. 3 and 4, the thin film transistor array substrate 300 comprises a substrate 310, a plurality of scan lines 320, a plurality of data lines 330, a plurality of thin film transistors 340, a plurality of pixel electrodes 350, a plurality of common lines 360, a plurality of capacitor electrodes 370 and a plurality of connecting conductive layers 380.

The scan line 320 and the data line 330 are disposed on the substrate 310, wherein the scan line 320 and the data line 330 define a plurality of pixel areas 312 on the substrate 310. Each of the thin film transistors 340 is disposed in one of the pixel areas 312, wherein the thin film transistor 340 are electrically connected to by the scan line 320 and the data line 330. Each of the pixel electrodes 350 is disposed in one of the pixel areas 312 and coupled to one of the thin film transistors 340 corresponding thereto. The common line 360 is disposed on the substrate 310. A portion area of each of the pixel electrodes 350 is located over one of the common lines 360. Each of the capacitor electrodes 370 is disposed between one of the pixel electrodes 350 and one of the common lines 360.

Referring to FIGS. 3 and 4, each of the pixel electrodes 350, the common lines 360 and the capacitor electrodes 370 have the first opening 352, the second opening 362 and a third opening 372, respectively. The second opening 362 of the common line 360 and the third opening 372 of the capacitor electrode 370 are located in the first opening 352. The third opening 372 and the second opening 362 are partially overlapped. A portion area of one of the common lines 360 is exposed by the third opening 372 of the capacitor electrode 370. A portion area of the common line 360 and a portion of the capacitor electrode 370 are exposed by the first opening 352 of the pixel electrode 350.

The pixel electrode 350 further comprises at least a first slit 354 and a second slit 356. The extension direction of the first slit 354 is substantially different from that of the second slit 356. The first slit 354 and the second slit 356 is connected to the first opening 352. In other words, the thin film transistor array substrate of the present invention can be used to a multi-domain vertical alignment liquid crystal display (MVA-LCD). The slits formed on the pixel electrode change the electrical field between two substrates. Accordingly, liquid crystal between the two substrates can be evenly distributed so as to provide wide view angle of the LCD. The first opening and the slits are, for example, formed simultaneously.

The connecting conductive layer 380 is located in the first opening 352 and is coupled to the capacitor electrode 370 and the common line 360 corresponding thereto. In this embodiment, the connecting conductive layer 380 comprises a first connecting area and a second connecting area 382 and a repairing area 384. The first connecting areas 382 is coupled to the capacitor electrode 370 and the second connecting area 382 is coupled to the common line 360. The repairing area 384 corresponds to the overlap area of the third opening 372 and the second opening 362, serving as the position for laser welding.

The common line 360 further comprises a fourth opening 364 and a fifth opening 366. The second opening 362 is formed between the fourth and the fifth openings, serving as the positions for laser welding. A dielectric layer 400 is formed between the capacitor electrode 370 and the common line 360. The dielectric layer 400 covers the fourth opening 364 and the fifth opening 366. Moreover, a passivation layer 500 is between the pixel electrode 350 and the capacitor electrode 370. The passivation layer 500 comprises a first contact hole 510 and a second contact hole 520. The connecting conductive layer 380 is coupled to the common line 360 through the first contact hole 510 and the capacitor electrode 370 through the second contact hole 520.

In the thin film transistor array substrate of the present invention, the connecting conductive layer in the first opening connects the capacitor electrode and the common line so as to form a first-metal/insulator/indium-tin-oxide (MII) storage capacitor. It should be noted that particles and defects occurred during processes may render the MII storage capacitors defective. Following are various descriptions for repairing the failed MII storage capacitors. The present invention, however, is not limited thereto.

Figure 5:
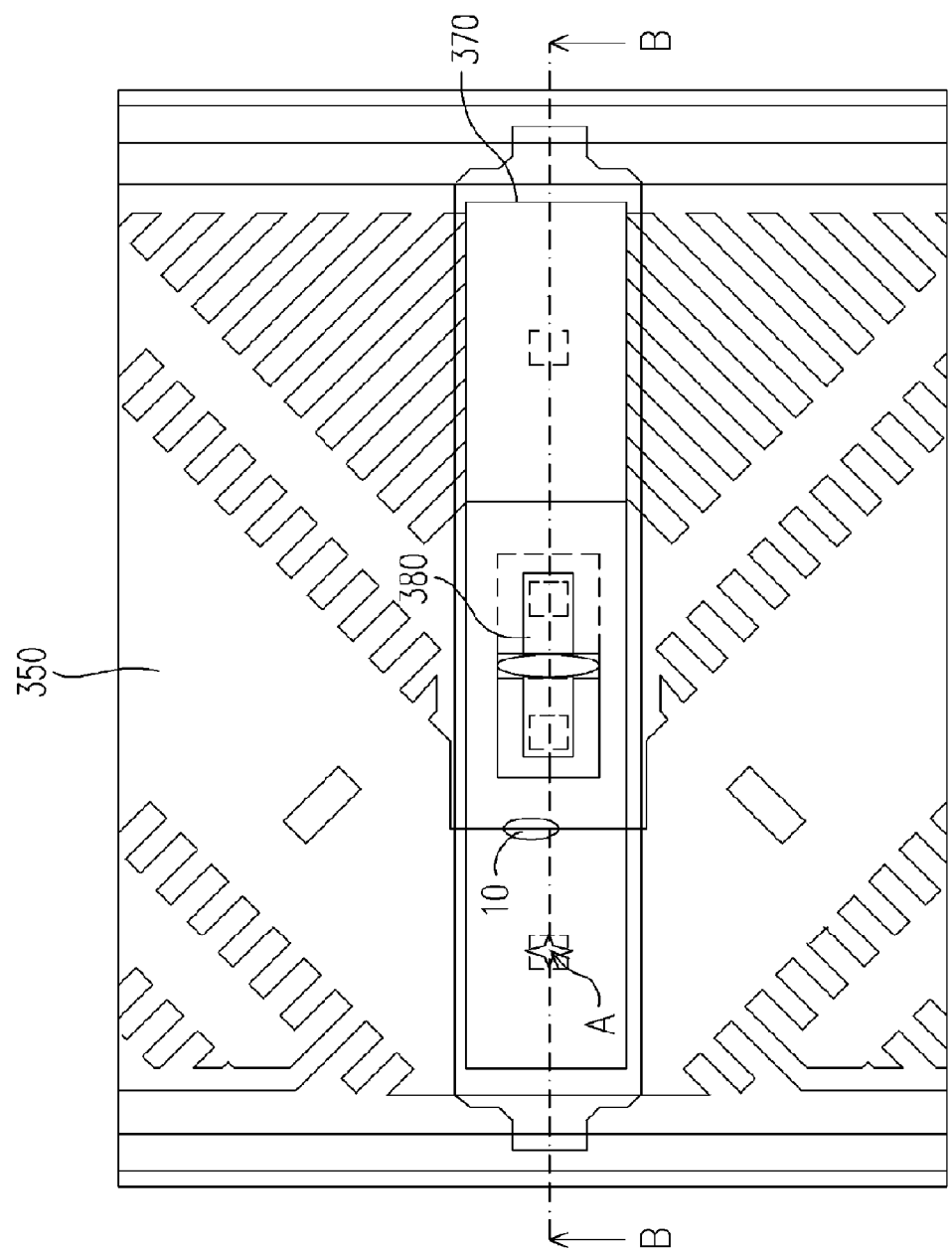
FIG. 5 is a schematic drawing showing a repaired thin film transistor array substrate according to an embodiment of the preset invention.
Figure 6:
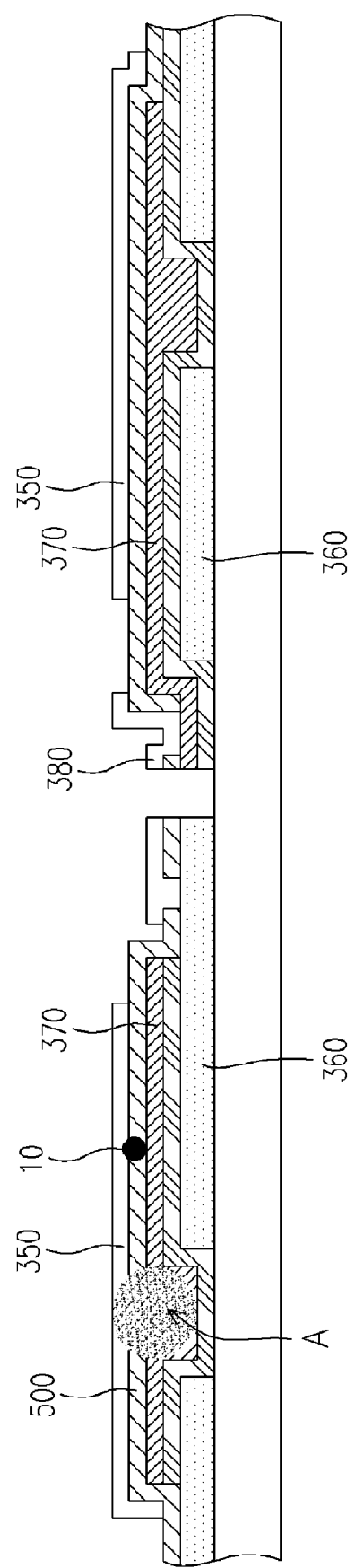
FIG. 6 is a cross sectional view of the thin film transistor array substrate along B-B in FIG. 5.

FIG. 5 is a schematic drawing showing a repaired thin film transistor array substrate according to an embodiment of the preset invention. FIG. 6 is a cross sectional view of the thin film transistor array substrate along B-B in FIG. 5. When a particle or a defect 10 exists between the pixel electrode 350 and the capacitor electrode 370, the storage capacitor formed by the pixel electrode 350 and the capacitor electrode 370 corresponding thereto becomes defective. For repairing this defect, first, a portion area of the connecting conductive layer 380 of the defective storage capacitor is removed so as to isolate the capacitor electrode 370 of the defective storage capacitor from the common line 360 corresponding thereto. Next, the pixel electrode 350 corresponding to the fourth opening 364 and the fifth opening 366, and the capacitor electrode 370 at the location A are welded.

In this embodiment, the removed a portion area of the connecting conductive layer 380 of the defective storage capacitor can be located, for example, at the repairing area 384 of the connecting conductive layer 380. When the particle or defect 10 is near the fourth opening 364, the capacitor electrode 370 and the pixel electrode 350 corresponding to the fourth opening 364 are welded during the repairing process. Accordingly, the pixel electrode 350 has a voltage similar to that of the capacitor electrode 370. One of ordinary skill in the art will understand that the capacitor electrode 370 and the fifth opening 366 corresponding to the pixel electrode 350 can be welded for repairing the defect or the capacitor electrode 370 and the pixel electrode 350 corresponding to the fourth opening 364 and the fifth opening 366 can be welded for repairing the defect. Accordingly, the pixel electrode 350 has a voltage similar to that of the capacitor electrode 370. The method of removing the portion area of the connecting conductive layer 380 of the defective storage capacitor can be, for example, a laser cutting process. The method of welding the capacitor electrode 370 and the pixel electrode 350 corresponding to the fourth opening 364 and the fifth opening 366 can be, for example, a laser welding process. By repairing the defect in a manner described above, the common line 360 and the capacitor electrode 370 constitute a first-metal/insulator/second-metal (MIM) storage capacitor. The repaired storage capacitor functions normally and the yield is improved.

Figure 7:
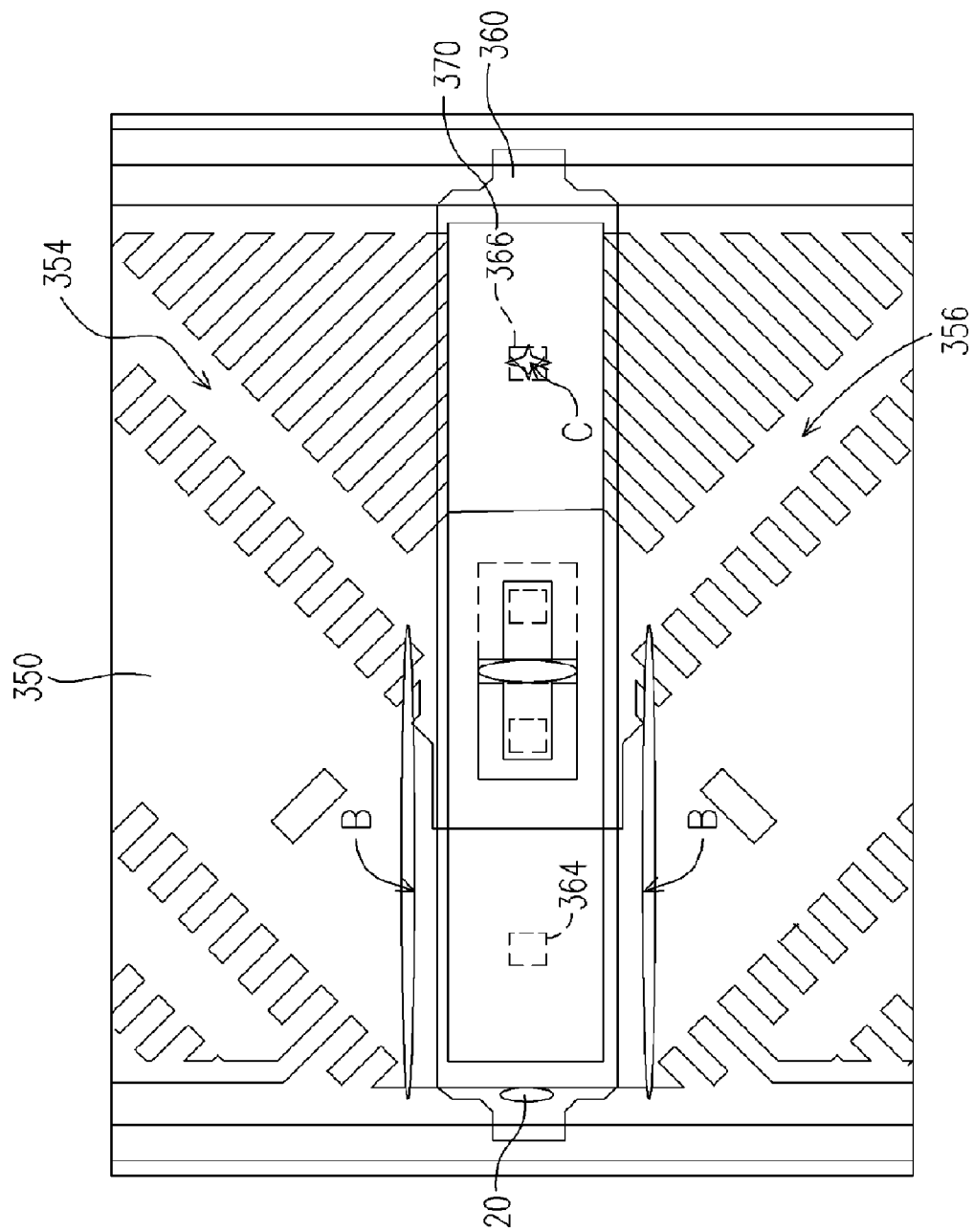
FIG. 7 is a schematic drawing showing a repaired thin film transistor array substrate according to another embodiment of the preset invention.

FIG. 7 is a schematic drawing showing a repaired thin film transistor array substrate according to another embodiment of the preset invention. Referring to FIG. 7, when a particle or a defect 20 exists between the pixel electrode 350 and the common line 360, the storage capacitor formed by the pixel electrode 350 and the capacitor electrode 370 corresponding thereto becomes defective. For repairing this defect, first, a portion area of the connecting conductive layer 380 of the defective storage capacitor is removed so as to isolate the capacitor electrode 370 of the defective storage capacitor from the common line 360 corresponding thereto. Next, a portion area of the pixel electrode 350 of the defective storage capacitor is removed so as to isolate the pixel electrode 350 from the common line 360. Finally, the pixel electrode 350 corresponding to the fourth opening 364 and the fifth opening 366, and the capacitor electrode 370 at the location A are welded.

In this embodiment, the removed a portion area of the connecting conductive layer 380 of the defective storage capacitor can be located, for example, at the repairing area 384 of the connecting conductive layer 380. When the particle or defect 20 is near to the fourth opening 364, a portion area of the pixel electrode 350 of the defective storage capacitor, i.e. the location B, is removed so as to isolate the pixel electrode 350 from the common line 360. Finally, the pixel electrode 350 corresponding to the fourth opening 364 and the fifth opening 366, and the capacitor electrode 370 at the location C are welded. The method of removing the a portion area of the connecting conductive layer 380 or the pixel electrode 350 of the defective storage capacitor can be, for example, a laser cutting process. The method of welding the capacitor electrode 370 and the pixel electrode 350 corresponding to the fourth opening 364 and the fifth opening 366 can be, for example, a laser welding process. After repairing, the common line 360 and the capacitor electrode 370 constitute a first-metal/insulator/second-metal (MIM) storage capacitor.

Figure 8:
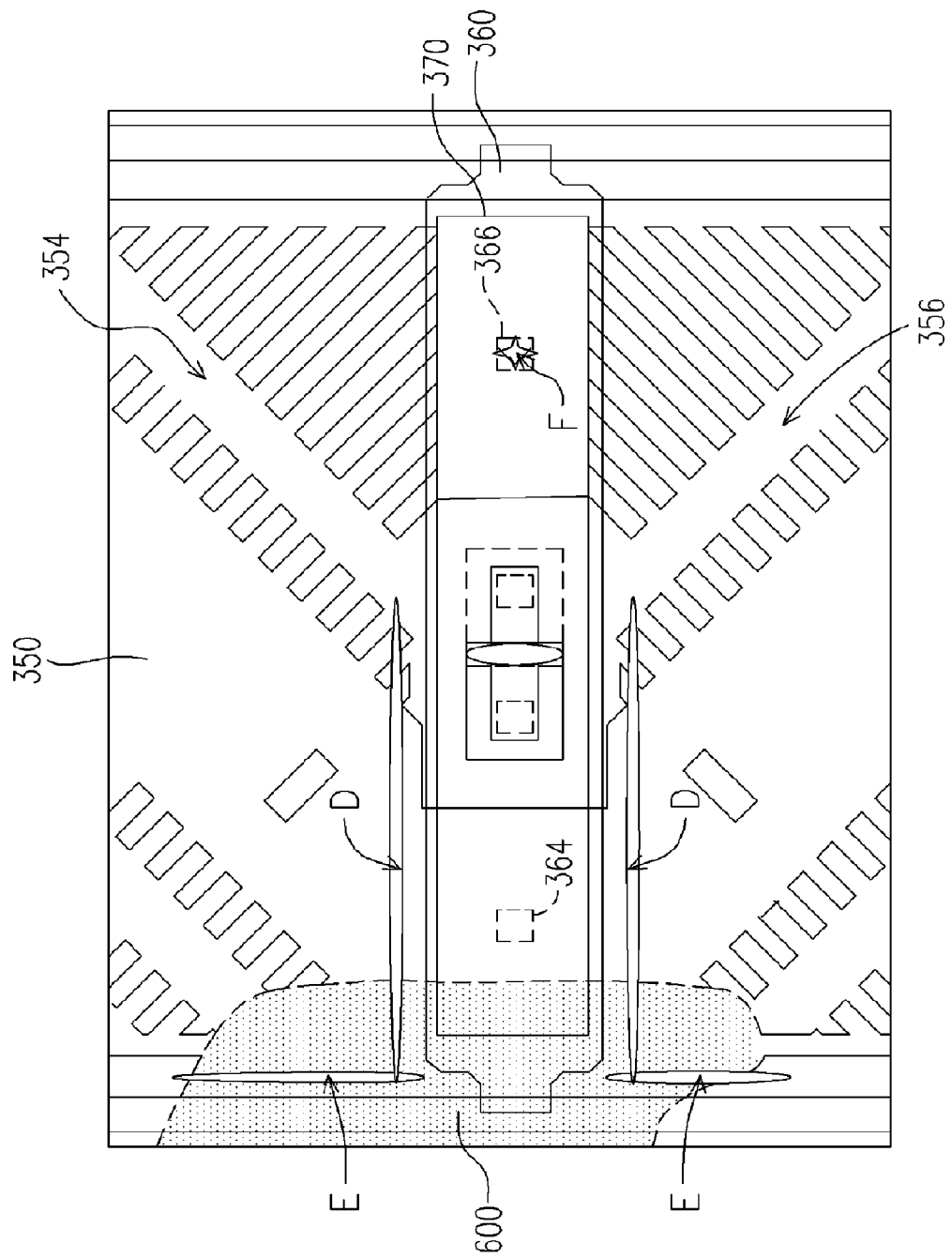
FIG. 8 is a schematic drawing showing a repaired thin film transistor array substrate according to another embodiment of the preset invention.

FIG. 8 is a schematic drawing showing a repaired thin film transistor array substrate according to another embodiment of the preset invention. Referring to FIG. 8, when a pixel electrode residue 600 exists between two pixel electrodes, a storage capacitor formed by one of the pixel electrodes and one of the capacitor electrodes corresponding thereto becomes defective. For repairing this defect, a portion area of the connecting conductive layer 380 of the defective storage capacitor is removed so as to isolate the capacitor electrode 370 of the defective storage capacitor from the common line 360 corresponding thereto. Next, a portion area of the pixel electrode 370 of the defective storage capacitor and a portion area of the pixel electrode residue 600 are removed so as to isolate the two pixel electrodes 350 from each other. Finally, the pixel electrode 350 corresponding to the fourth opening 364 and the fifth opening 366, and the capacitor electrode 360 are welded.

In this embodiment, the removed a portion area of the connecting conductive layer 380 of the defective storage capacitor can be located, for example, at the repairing area 384 of the connecting conductive layer 380. When the pixel electrode residue 600 is near the fourth opening 364, a portion area of the pixel electrode 350 near to the fourth opening 364, i.e. the location D, and the portion area of the pixel electrode residue 600 are removed so as to isolate the pixel electrodes 350 from each other. Next, the pixel electrode 350 corresponding to the fifth opening 366 and the capacitor electrode 370 at the location F are welded. The method of removing the portion area of the connecting conductive layer 380, the pixel electrode 350 and the pixel electrode residue 600 can be, for example, a laser cutting process. The method of welding the capacitor electrode 370 and the pixel electrode 350 can be, for example, a laser welding process. After repairing, the common line 360 and the capacitor electrode 370 constitute a first-metal/insulator/second-metal (MIM) storage capacitor.

Figure 9:
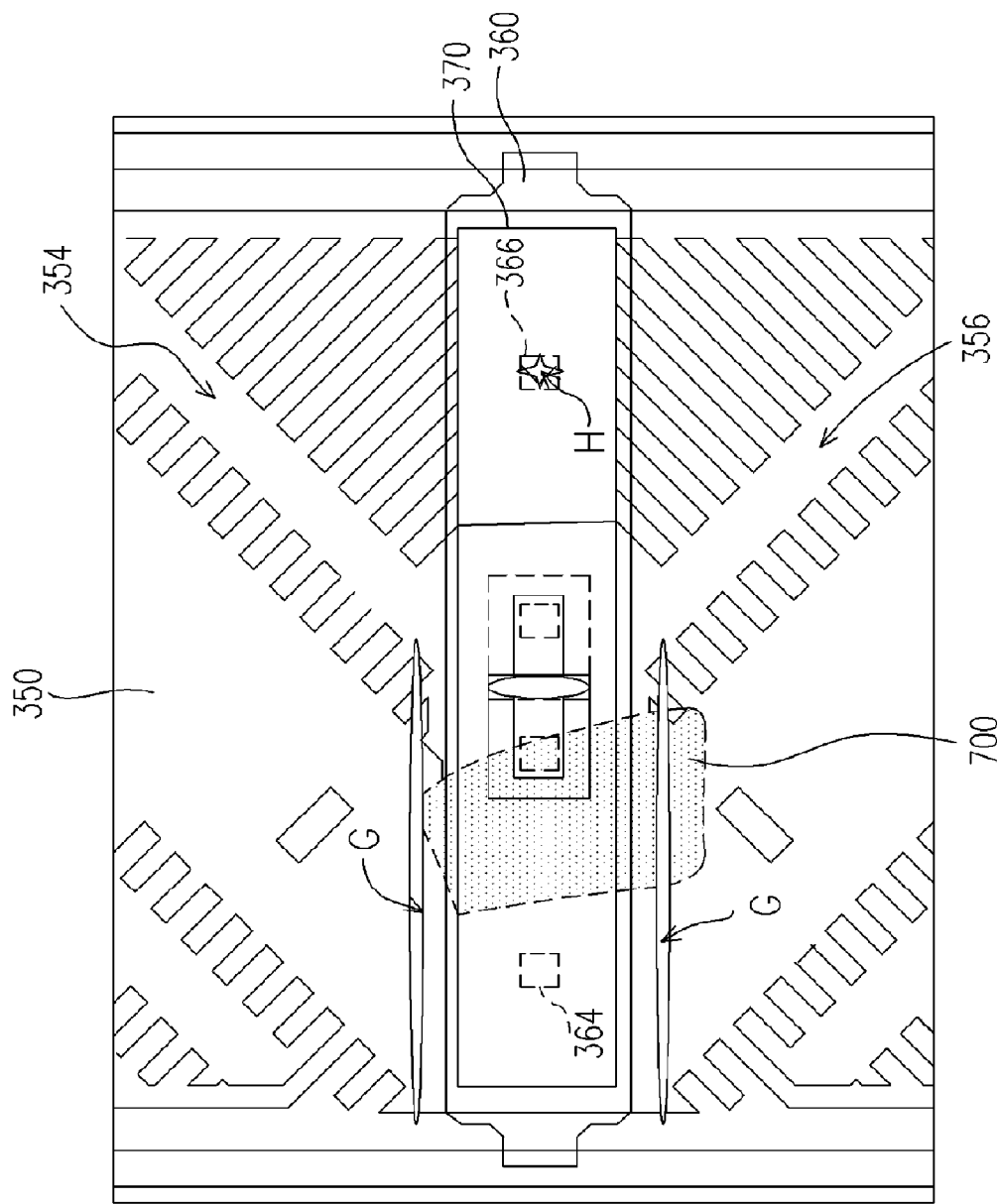
FIG. 9 is a schematic drawing showing a repaired thin film transistor array substrate according to another embodiment of the preset invention.

FIG. 9 is a schematic drawing showing a repaired thin film transistor array substrate according to another embodiment of the preset invention. Referring to FIG. 9, when a pixel electrode residue 700 exists on the pixel electrode 350 and the pixel electrode residue 700 contacts a portion area of the connecting conductive layer 380, a storage capacitor formed by the pixel electrode 350 and the capacitor electrode 350 corresponding thereto becomes defective. For repairing this defect, a portion area of the connecting conductive layer 380 of the defective storage capacitor is removed so as to isolate the capacitor electrode 370 of the defective storage capacitor from the common line 360 corresponding thereto. Next, a portion area of the pixel electrode 350 of the defective storage capacitor and a portion area of the pixel electrode residue 700 are removed so as to isolate the pixel electrode 350 from the connecting conductive layer 380. Finally, the pixel electrode 350 corresponding to the fourth opening 364 and the fifth opening 366, and the capacitor electrode 370 are welded.

In this embodiment, the removed a portion area of the connecting conductive layer 380 of the defective storage capacitor can be located, for example, at the repairing area 384 of the connecting conductive layer 380. When the pixel electrode residue 700 is near the fourth opening 364, a portion area of the pixel electrode 350 near the fourth opening 364, i.e. the location G, and the portion area of the pixel electrode residue 700 are removed so as to isolate the pixel electrodes 350 from each other. Finally, the pixel electrode 350 corresponding to the fifth opening 366 and the capacitor electrode 370 at the location H are welded. The method of removing a portion area of the connecting conductive layer 380, the pixel electrode 350 and the pixel electrode residue 700 can be, for example, a laser cutting process. The method of welding the capacitor electrode 370 and the pixel electrode 350 can be, for example, a laser welding process. By repairing, the common line 360 and the capacitor electrode 370 constitute a first-metal/insulator/second-metal (MIM) storage capacitor.

Figure 10:
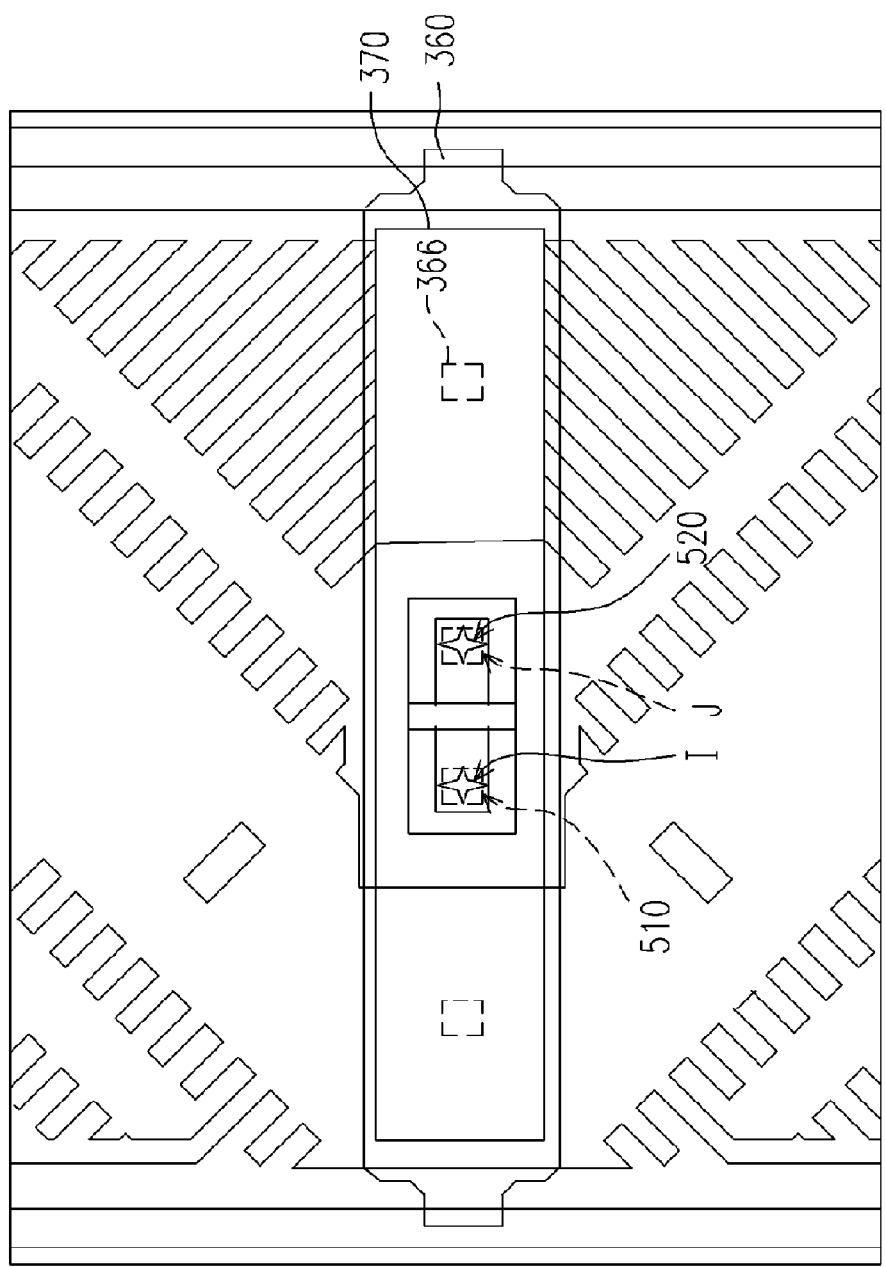
FIG. 10 is a schematic drawing showing a repaired thin film transistor array substrate according to another embodiment of the preset invention.

FIG. 10 is a schematic drawing showing a repaired thin film transistor array substrate according to another embodiment of the preset invention. Referring to FIG. 10, when a first contact hole 510 and/or a second contact hole 520 is not opened, a storage capacitor formed by the pixel electrode 350 and the capacitor electrode 370 corresponding thereto becomes defective. Next, the connecting conductive layer 380 corresponding to the first contact hole 510 and/or the second contact hole 520, and a portion area of the common line 360 at locations I and J are welded. By repairing, the common line 360 and the capacitor electrode 370 constitute a first-metal/insulator/second-metal (MIM) storage capacitor.

Accordingly, the material of the connecting conductive layer is not specified for these embodiments described above. For simplicity, the material of the connecting conductive layer can be similar to that of the pixel electrode, such as indium tin oxide (ITO) or indium zinc oxide (IZO). In other words, while forming the pixel electrode, the method defines two areas on the pixel electrode. One serves as the connecting conductive layer, and the other serves as the display area of the pixel. These embodiments described above are all used in MVA-LCDs. The present invention, however, is not limited thereto, and can be used in TN or STN LCDs. Optionally slits may be formed on the pixel electrode. The thin film transistor array substrates of these embodiments are substrates, which have storage capacitors on the common lines. One of ordinary skill in the art will understand that the repairing method of the present invention can be used on substrates, which have storage capacitors on the gates.

Accordingly, in the method of forming the thin film transistor array, according to an embodiment of the present invention, an opening is formed on each of the pixel electrode, the capacitor electrode and the common line. The openings formed on the capacitor electrode and the common line are formed in the opening formed on the pixel electrode. The opening on the pixel electrode exposes a portion area of the common line and the connecting conductive layer. The capacitor electrode is coupled to the common line by forming the connecting conductive layer in the pixel electrode so as to form a first-metal/insulator/indium-tin-oxide (MII) storage capacitor formed by the pixel electrode and the capacitor electrode. When the storage capacitors fail due to particles/defects, un-opened contact holes or pixel electrode residues, the (MII) storage capacitor can be switched to the first-metal/insulator/second-metal (MIM) storage capacitor by a laser cutting process. Accordingly, the repaired pixel functions normally and the yield is improved.

Accordingly, the present invention has following advantages.

1. The MII storage capacitor can be repaired to form the MIM storage capacitor. This repairing method is practical and feasible.

2. The repairing method of the present invention is capable of repairing the storage capacitors with particles, defects, un-opened contact holes or pixel electrode residues. One-defect pixels can be repaired to form zero-defect pixels. The yield is thus improved.

Although the present invention has been described in terms of exemplary embodiments, it is not limited thereto. Rather, the appended claims should be constructed broadly to include other variants and embodiments of the invention, which may be made by those skilled in the field of this art without departing from the scope and range of equivalents of the invention.

What is claimed is:

1. A thin film transistor array substrate, comprising:
a substrate;
a plurality of scan lines disposed on the substrate;
a plurality of data lines disposed on the substrate, wherein the scan lines and the data lines define a plurality of pixel areas on the substrate;
a plurality of thin film transistors, each of the thin film transistors being disposed in one of the pixel areas;
a plurality of pixel electrodes, each of the pixel electrodes being disposed in one of the pixel areas and coupled to one of the thin film transistor corresponding thereto, and each of the pixel electrodes having a first opening;
a plurality of common lines disposed on the substrate, a portion area of each pixel electrode being located over one of the common lines, each of the common lines having a second opening in the first opening;
a plurality of capacitor electrodes having a third opening located in the first opening, each of the capacitor electrodes being disposed between one of the pixel electrodes and one of the common lines, wherein the third opening and the second opening are partially overlapped and a portion area of one of the common lines is exposed by the third opening; and
a plurality of connecting conductive layers, each of the connecting conductive layers being disposed in the first opening, wherein each of the connecting conductive layers is coupled to one of the capacitor electrodes and one of the common lines.

2. The thin film transistor array substrate of claim 1, wherein each of the common lines further comprises a fourth opening and a fifth opening, and the second opening is formed between the fourth opening and the fifth opening.

3. The thin film transistor array substrate of claim 2, further comprising a dielectric layer disposed between the capacitor electrodes and the common lines, the dielectric layer covering the fourth opening and the fifth opening.

4. The thin film transistor array substrate of claim 2, further comprising a passivation layer disposed between the pixel electrodes and the capacitor electrodes, wherein the passivation layer comprises a plurality of first contact holes and a plurality of second contact holes, each of the connecting conductive layers being coupled to one of the common lines through one of the first contact holes and being coupled to one of the capacitor electrodes through one of the second contact holes.

5. A method of repairing the thin film transistor array substrate of claim 4, wherein a first contact hole within the passivation layer is not formed, a storage capacitor formed by one of the pixel electrodes and one of the capacitor electrodes corresponding thereto is rendered defective, the method comprising:
welding the connecting conductive layer corresponding to the first contact hole and a portion area of the common line.

6. The method of repairing the thin film transistor array substrate of claims 5, wherein the step of welding the connecting conductive layer corresponding to the first contact hole and a portion area of the common line comprise a laser welding process.

7. A method of repairing the thin film transistor array substrate of claim 4, wherein a second contact hole within the passivation layer is not formed, a storage capacitor formed by one of the pixel electrodes and one of the capacitor electrodes corresponding thereto is rendered defective, the method comprising:
welding the connecting conductive layer corresponding to the second contact hole and a portion area of the capacitor electrode.

8. The method of repairing the thin film transistor array substrate of claims 7, wherein the step of welding the connecting conductive layer corresponding to the second contact hole and a portion area of the common line comprise a laser welding process.

9. The thin film transistor array substrate of claim 2, wherein each of the pixel electrodes comprises a first slit and a second slit, the extension direction of the first slit is substantially different from that of the second slit, and the first slit and the second slit is connected to the first opening.

10. The thin film transistor array substrate of claim 1, wherein each of the connecting conductive layers comprises a first connecting area, a second connecting area and a repairing area, the first connecting area being coupled to one of the capacitor electrode and the second connecting area being coupled to one of the common lines, the repairing area corresponding to an overlap area of the second opening and the third opening.

11. The thin film transistor array substrate of claim 1, wherein the connecting conductive layers and the pixel electrodes are of the same material.

12. The thin film transistor array substrate of claim 11, wherein the material of the connecting conductive layers and the pixel electrodes is indium tin oxide or indium zinc oxide.

13. A method of repairing the thin film transistor array substrate of claim 1, wherein a defect exists between one of the pixel electrodes and one of the common lines, a storage capacitor formed by one of the pixel electrodes and one of the capacitor electrodes corresponding thereto is rendered defective, the method comprising:
removing a portion area of the connecting conductive layer of the defective storage capacitor so as to isolate the capacitor electrode of the defective storage capacitor from the common line corresponding thereto;
removing a portion area of the pixel electrode of the defective storage capacitor so as to isolate the pixel electrode from the common line of the defective storage capacitor; and
welding the pixel electrode and the capacitor electrode of the defective storage capacitor through an opening formed in the common line.

14. The method of repairing a thin film transistor array substrate of claim 13, wherein the step of removing the portion area of the connecting conductive layer of the defective storage capacitor comprises a laser cutting process.

15. The method of repairing a thin film transistor array substrate of claim 13, wherein the step of removing the portion area of the pixel electrode of the defective storage capacitor comprises a laser cutting process.

16. The method of repairing a thin film transistor array substrate of claim 13, wherein the step of welding the pixel electrode corresponding and the capacitor electrode of the defective storage capacitor comprises a laser welding process.

17. A method of repairing the thin film transistor array substrate of claim 1, wherein a particle or a defect exists between one of the pixel electrodes and one of the capacitor electrodes, a storage capacitor formed by one of the pixel electrodes and one of the capacitor electrodes corresponding thereto is rendered defective, the method comprising:

removing a portion area of the connecting conductive layer of the defective storage capacitor so as to isolate the capacitor electrode of the defective storage capacitor from the common line corresponding thereto; and welding the pixel electrode and the capacitor electrode of the defective storage capacitor through an opening formed in the common line.

18. The method of repairing a thin film transistor array substrate of claim 17, wherein the step of removing the portion area of the connecting conductive area of the defective storage capacitor comprises a laser cutting process.

19. The method of repairing a thin film transistor array substrate of claim 17, wherein the step of welding the pixel electrode and the capacitor electrode of the defective storage capacitor comprises a laser welding process.

20. A method of repairing the thin film transistor array substrate of claim 1, wherein a pixel electrode residue exists between two pixel electrodes, a storage capacitor formed by one of the pixel electrodes and one of the capacitor electrodes corresponding thereto is rendered defective, the method comprising:

removing a portion area of the connecting conductive layer of the defective storage capacitor so as to isolate the capacitor electrode of the defective storage capacitor from the common line corresponding thereto;

removing a portion area of the pixel electrode of the defective storage capacitor and a portion area of the pixel electrode residue so as to isolate the two pixel electrodes from each other; and welding the pixel electrode and the capacitor electrode of the defective storage capacitor through an opening formed in the common line.

21. The method of repairing a thin film transistor array substrate of claim 20, wherein the step of removing the portion area of the connecting conductive area of the defective storage capacitor comprises a laser cutting process.

22. The method of repairing a thin film transistor array substrate of claim 20, wherein the step of removing the portion area of the pixel electrode of the defective storage capacitor and the portion area of the pixel electrode residue so as to isolate the two pixel electrodes comprises a laser cutting process.

23. The method of repairing a thin film transistor array substrate of claim 20, wherein the step of welding the pixel electrode and the capacitor electrode of the defective storage capacitor comprises a laser welding process.

24. A method of repairing the thin film transistor array substrate of claim 1, wherein a pixel electrode residue exists on one of the pixel electrodes and the pixel electrode residue contacts a portion of one of the connecting conductive layers, a storage capacitor formed by one of the pixel electrodes and one of the capacitor electrodes corresponding thereto is rendered defective, the method comprising:

removing a portion area of the connecting conductive layer of the defective storage capacitor so as to isolate the capacitor electrode of the defective storage capacitor from the common line corresponding thereto;

removing a portion area of the pixel electrode of the defective storage capacitor and a portion area of the pixel electrode residue so as to isolate the pixel electrode from the connecting conductive layer; and welding the pixel electrode and the capacitor electrode of the defective storage capacitor through an opening formed in the common line.

25. The method of repairing a thin film transistor array substrate of claim 24, wherein the step of removing the portion area of the connecting conductive area of the defective storage capacitor comprises a laser cutting process.

26. The method of repairing a thin film transistor array substrate of claim 24, wherein the step of removing the portion area of the pixel electrode of the defective storage capacitor and the portion area of the pixel electrode residue comprises a laser cutting process.

27. The method of repairing a thin film transistor array substrate of claim 24, wherein the step of welding the pixel electrode and the capacitor electrode of the defective storage capacitor comprises a laser welding process.

* * * * *